United States Patent
Weng et al.

(10) Patent No.: US 11,208,569 B2
(45) Date of Patent: Dec. 28, 2021

(54) CONTINUOUS INKJET INK COMPOSITION

(71) Applicant: VIDEOJET TECHNOLOGIES INC., Wood Dale, IL (US)

(72) Inventors: Wei Weng, Naperville, IL (US); Fengfei Xiao, Glenview, IL (US); Godwin Deng, Schaumberg, IL (US); Linfang Zhu, Woodridge, IL (US)

(73) Assignee: VIDEOJET TECHNOLOGIES INC., Wood Dale, IL (US)

( * ) Notice: Subject to any disclaimer, the term of this patent is extended or adjusted under 35 U.S.C. 154(b) by 0 days.

(21) Appl. No.: 16/756,654

(22) PCT Filed: Oct. 15, 2018

(86) PCT No.: PCT/US2018/055806
§ 371 (c)(1),
(2) Date: Apr. 16, 2020

(87) PCT Pub. No.: WO2019/079149
PCT Pub. Date: Apr. 25, 2019

(65) Prior Publication Data
US 2020/0332136 A1  Oct. 22, 2020

Related U.S. Application Data

(60) Provisional application No. 62/572,637, filed on Oct. 16, 2017.

(51) Int. Cl.
| | |
|---|---|
| *C09D 11/103* | (2014.01) |
| *B41J 2/02* | (2006.01) |
| *B41M 5/00* | (2006.01) |
| *C09D 11/328* | (2014.01) |
| *B41J 2/21* | (2006.01) |
| *B41J 2/01* | (2006.01) |

(52) U.S. Cl.
CPC .............. *C09D 11/103* (2013.01); *B41J 2/01* (2013.01); *B41J 2/02* (2013.01); *B41J 2/2107* (2013.01); *B41M 5/0023* (2013.01); *C09D 11/328* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 2/04588; B41J 2/04595; B41J 2/04586; B41J 2/14274; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | |
|---|---|---|
| 4,200,706 A | 4/1980 | Starks |
| 4,465,800 A | 8/1984 | Bhatia |
| 8,846,782 B2 | 9/2014 | Li et al. |
| 8,921,459 B2 | 12/2014 | Li et al. |
| 9,284,463 B2 | 3/2016 | Brown et al. |
| 9,296,910 B2 | 3/2016 | Brown et al. |
| 9,464,193 B2 | 10/2016 | Hagiopol et al. |
| 2006/0229415 A1* | 10/2006 | Boyer ................... C08J 3/03 525/390 |
| 2010/0178442 A1* | 7/2010 | O'Brien ................ B05D 7/227 428/35.8 |
| 2010/0233368 A1* | 9/2010 | Zhu ...................... C09D 11/328 427/256 |

(Continued)

FOREIGN PATENT DOCUMENTS

WO  2014134442 A1  9/2014

OTHER PUBLICATIONS

PCT/US2018/55806 International Search Report and Written Opinion, dated Jan. 8, 2019, 12 pages.

*Primary Examiner* — Manish S Shah
(74) *Attorney, Agent, or Firm* — Wolter Van Dyke Davis, PLLC; Robert L. Wolter

(57) ABSTRACT

Embodiments of the invention relate to ink compositions suitable for applications in the printing industry, for example continuous inkjet printing, including ultra-high speed continuous inkjet printing. The ink compositions use volatile organic solvents, a colorant, and one or more binder resins including a resin that is a phenolic resole resin, wherein the ink composition is free of methanol, halogens, halogenated compounds and bisphenol-A. A phenolic resole resin of the ink composition preferably contains less than 0.1% by weight of free formaldehyde. The one or more binder resins including the phenolic resole resin may be present in an amount that is from about 5% to about 30% by weight of the ink composition.

28 Claims, No Drawings

(56) References Cited

U.S. PATENT DOCUMENTS

| | | | | |
|---|---|---|---|---|
| 2013/0027478 A1* | 1/2013 | Kozee | ................... | C09D 11/322 |
| | | | | 347/73 |
| 2014/0010925 A1* | 1/2014 | Knight | ................. | C08G 63/916 |
| | | | | 428/35.8 |
| 2015/0291816 A1* | 10/2015 | Cross | ..................... | C09D 11/03 |
| | | | | 524/265 |
| 2015/0376435 A1* | 12/2015 | Youlton | ............... | C09D 161/06 |
| | | | | 206/524.3 |
| 2016/0108265 A1* | 4/2016 | Robertson | .................. | B41J 2/01 |
| | | | | 347/100 |
| 2016/0177117 A1 | 6/2016 | Brown et al. | | |

\* cited by examiner

CONTINUOUS INKJET INK COMPOSITION

BACKGROUND

In ink jet printing, printing is accomplished without contact between the printing device and the substrate on which the printed characters are deposited. Briefly described, continuous inkjet (CIJ) printing involves projecting a stream of ink droplets onto a surface and controlling the direction of the stream, e.g., electronically, so that the droplets are caused to form the desired printed image on that surface. This technique of noncontact printing is well suited for application of characters onto a variety of surfaces including porous and non-porous surfaces.

In general, an inkjet ink composition should meet certain requirements to be useful in inkjet printing operations. These relate to viscosity, resistivity, solubility, compatibility of components, and wettability of the substrate. Further, the ink should be quick-drying and smear-resistant, should be capable of passing through the inkjet nozzle without clogging, and should permit rapid cleanup of the machine components with minimum effort. In addition, the jet ink composition should provide printed images that adhere well to the substrates, particularly non-porous substrates, which, as is known to those of ordinary skill in the art pose challenges with respect to achieving image adhesion.

Continuous inkjet (CIJ) ink compositions are generally formulated to include one or more solvents, one or more colorants and one or more binder resins. Inkjet compositions may also include one or more surfactants, plasticizers, adhesion promoters, conductive agents, defoamers, and mixtures thereof. Some commercially available inks include phenolic resins as binder resins. Phenolic resins are obtained by step growth polymerization of di-functional monomers (aldehydes) with monomers of functionality greater than 2 (Phenol, substituted Phenols or combination of phenols). There are 2 types of phenolic resins, novolac and resole. Novolac type phenolic resins are thermoplastic. Resole type phenolic resins undergo cross-link reactions at elevated temperatures and display good adhesion to non-porous substrates such as glass, polymer films, aluminum and steel. The cured ink jetted images also have excellent chemical resistance and scratch resistance.

During some production line printing operations, a non-porous substrate having been marked with an ink may be subjected to heat in order to cure the ink on the substrate for adhesion. Phenolic resins are effective in this regard as they undergo the above-mention cross-link reactions which promotes curing and adhesion to the nonporous substrate. However, some of these phenolic resins in commercial inks have 0.3%, by weight, or greater, of free formaldehyde, which classifies the phenolic resins as a category 1B carcinogen according to the European Classification Labeling and Packaging (CLP) Regulations.

Some commercial thermo-curable continuous inkjet inks use methanol as the solvent or the main solvent because such inks produce a fast-dry time due to their volatility, good adhesion, and because methanol is a good solvent for the binder resins and conductive agents in the inks. However, methanol is known as a toxic substance that may cause health issues due to inhalation, especially if the exposure occurs over an extended period of time.

Some ink composition components such as binder resins and conductive agents and other additives include halogens or halogenated compounds. Some halogens, such as fluorine and chlorine, especially in gaseous form, are extremely toxic. In addition, halogen free materials are required at many businesses in the electrical and electronic industries. Yet another potential chemical compound that may be found in the phenolic resins of some commercial thermo-curable inkjet inks is bisphenol-A (BPA), which exist as an unreacted free monomer in the phenolic resin. The safety of this compound has been investigated by several governments and the FDA. Bisphenol A is a Category 2 reproductive toxin. Although an ink containing less than 0.3% of bisphenol A will not be considered a reproductive toxin, bisphenol A has gained a bad reputation as an endocrine disruptor due to its wide use in metal can coating and infant bottle in the past and is now banned in EU. The FDA has also recently amended its food additive regulation to no longer provide for the uses of BPA in baby bottles and infant formula packaging.

Thus, while CIJ ink compositions are manufactured as safe when manufactured and used within regulatory requirements, concerns remain about the use of certain chemicals in these inks. This is especially true when the printed ink is subjected to elevated temperatures during production line printing. Therefore, there is a need in the art for continuous inkjet ink compositions that meet the necessary requirements for reliable printing and safety to workers manufacturing and using the compositions.

SUMMARY OF THE INVENTION

The ink compositions according to embodiments of the invention are suitable for various ink and printing applications, preferably continuous inkjet printing in industrial applications, and use one or more binder resins including a phenolic resole resin. In addition, the ink composition is preferably free of or substantially free of methanol, halogen, halogenated compounds and bisphenol A. The phenolic resole resin preferably contains less than 0.1% by weight of free formaldehyde, which is below the regulatory limit amount of formaldehyde for classification of a category 1B carcinogen.

Embodiments of the invention relate to ink compositions which comprise (a) one or more organic solvents; (b) one or more binder resins including a phenolic resole; (c) one or more colorants; and, (d) wherein the ink composition is preferably free of or substantially free of methanol, halogen, halogenated compounds and bisphenol A.

An ink formulation containing 0.1% or more of a Category 1A or Category 1B carcinogen or mutagen is also considered a Category 1A or Category 1B carcinogen or mutagen. Formaldehyde is a Category 1A carcinogen and Category 2 mutagen. Phenol is a Category 2 mutagen. An ink mixture containing 0.1% or higher of free formaldehyde will be labeled as Category 1A carcinogen and a mixture containing 1% or higher of free phenol will be labeled as category 2 mutagen. Hence ink formulations containing less than 0.1% of free formaldehyde and less than 1% of free phenol have advantages over formulations that contain 0.1% or higher formaldehyde or 1% or higher phenol.

Accordingly, embodiments of the invention may include an ink composition comprising less than 0.1% by weight of free formaldehyde; and/or the ink composition may comprise a phenolic resole resin that contains less than 0.1% by weight of free formaldehyde. Embodiments of the ink composition may comprise a first phenolic resole resin that contains less than 0.1% by weight of free formaldehyde and a second phenolic resole resin that contains greater than 0.1% by weight of free formaldehyde, wherein the total amount or concentration of free formaldehyde is less than 0.1% by weight free formaldehyde. In some embodiments, the second phenolic resole resin contains more than 0.1% by weight and less than 0.6% by weight of free formaldehyde, but the total concentration of free formaldehyde in the ink composition is less than 0.1% by weight of free formaldehyde.

Embodiments according to the invention include an ink composition comprising: (a) one or more organic solvents; (b) at least two binder resins including a first resin that is a phenolic resole resin having less than 0.1% by weight of the resin of free formaldehyde, and a second resin; and (c) one or more colorants. Preferred embodiments according to the invention comprise (a), (b), and (c) above, wherein the ink composition contains from about 5% by weight to about 30% by weight of the first resin, preferably from about 10% by weight to about 25% by weight of the first resin, and more preferably about 15% to about 22% by weight of the first resin.

Preferred embodiments of the ink compositions according to aspects of the invention are free of, or substantially free of methanol, halogens, halogenated compounds, and/or BPA.

Preferred ink compositions as described above are those wherein the phenolic resole resin is selected from the group of Phenodur VPR 1785/65B or phenodur VPR 1785/70B, HRJ-10518, SP-1045, or BRJ-473, and Bakelite PF 7835LB.

In preferred ink compositions, the second resin is selected from the group of resins containing hydroxyl or acid functional groups, such as other phenolic resins, acrylic resins, polyvinyl butyral resins, melamine resins, cellulose esters, cellulose ethers, styrene-acrylic copolymers, and nitrocellulose resins.

Other embodiments according to the invention include ink compositions which further comprise one or more additives selected from the group consisting of a surfactant, a plasticizer, an adhesion promoter, a conductive agent, a defoamer, and mixtures thereof. Surfactants preferably are polyalkyleneoxide modified polysiloxanes. Preferably the one or more surfactants are present in an amount from about 0.05% to about 2.0% by weight of the ink composition.

Additional embodiments according to the invention include a method of continuous inkjet printing on a substrate comprising: directing a stream of droplets of an ink composition as discussed above onto the substrate to form an image on the substrate and heating the ink on the substrate to a predetermined temperature or within a predetermined temperature range to cure and adhere the ink droplets to the substrate, to print an image on the substrate. The substrate can be porous, semi-porous, or non-porous, such as substrates selected from the group consisting of uncoated paper, coated paper, hard or soft plastics, polymer films, metals and alloys, glass, and ceramics.

DETAILED DESCRIPTION OF THE PREFERRED EMBODIMENTS

1. Definitions

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Unless otherwise defined, all technical and scientific terms used herein are intended to have the same meaning as commonly understood in the art to which this invention pertains at the time of its filing. Although various methods and materials similar or equivalent to those described herein can be used in the practice or testing of the present invention, suitable methods and materials are described below. However, the skilled should understand that the methods and materials used and described are examples and may not be the only ones suitable for use in the invention.

Moreover, it should also be understood that as measurements are subject to inherent variability, any temperature, weight, volume, time interval, pH, salinity, molarity or molality, range, concentration and any other measurements, quantities or numerical expressions given herein are intended to be approximate and not exact or critical figures unless expressly stated to the contrary. Hence, where appropriate to the invention and as understood by those of skill in the art, it is proper to describe the various aspects of the invention using approximate or relative terms and terms of degree commonly employed in patent applications, such as: about, approximately, substantially, essentially, consisting essentially of, comprising, and effective amount. Unless defined otherwise, all technical and scientific terms used herein have the same meaning as commonly understood by one of ordinary skill in the art.

The terms "inkjet" or "ink jet," as used herein, refer to inkjet printing, a type of printing that creates an image by propelling small droplets of ink onto a substrate such as paper, plastic, metal, glass, and the like. "Continuous inkjet" or "CIJ" methods are used, for example, in the marking and coding of products and packages. In this method, a pump directs a liquid ink composition from a reservoir to a nozzle to create a continuous ink stream. The nozzle uses ultrasonic vibration to separate the ink stream into small ink droplets as it exits the nozzle orifice. The ink droplets are subjected to a controlled and variable electrostatic field, and thereby are charged as the droplets form according to the varying electrostatic field. The charged droplets are deflected to the proper location by passing through another electrostatic field to print the desired pattern on a substrate, or are recycled back to the reservoir for future use.

The phrases "free of", "substantially free of" or "substantially no," as used herein, in the context of a solvent or other component in the inventive ink composition, refers to a condition in which preferably no appreciable or readily detectable amount of the indicated component is present in the composition. "Substantially no" or "substantially free of" can refer to an amount which is below the detection limit of commonly used detection methods known in the art, or below the maximum amount permitted for the compound by regulation. To that end, the halogen-free standard according to IPC-4101B specifies 900 ppm maximum of Cl, 900 ppm maximum of Br and 1500 ppm total halogens.

The term "solvent," as used herein, refers to a component whose primary function is to dissolve and carry the other components of the ink composition.

The term "colorant," as used herein, refers to a dye, pigment or other substance that imparts color or modifies the hue of something else, and can refer to any such substance. Colorants include black dyes as well as other colors.

The term "volatile," as used herein refers to the tendency of a substance to vaporize, related to the vapor pressure of the substance. A volatile solvent is one that has the capability of evaporating or going into a vapor phase. The volatility of a solvent may be based on a relative evaporation rate, usually relative to n-butyl acetate, wherein some solvents are more or less volatile than others.

The term "additive," as used herein, refers to an optional component that may be added to the inventive ink composition.

The term "binder resin," as used herein, refers to a substance that aids in making the ink composition stick to the substrate to which it is applied during printing. In general, a binder is a material that holds other materials together to form a cohesive whole or to impart adhesive properties.

The acronym "MEK," as used herein, refers to methyl ethyl ketone, also known as butanone. MEK is a colorless organic liquid solvent of the formula $CH_3C(O)CH_2CH_3$. The term "phenolic formaldehyde resin", as used herein, refers to synthetic polymers obtained by the reaction phenol or substituted phenol with formaldehyde. The term "phenolic resole resin," as used herein, shall refer to a phenole-formaldehyde resin made with a formaldehyde to phenol ratio of greater than one, usually 1.5.

2. Overview

The ink compositions described herein employ one or more volatile organic solvents, along with one or more binder resins including a phenolic resole resin and a colorant, wherein the ink composition is free or substantially free of methanol, halogens, halogenated compounds and bisphenol-A. Embodiments of ink compositions described herein may include one or more binder resins including a phenolic resole resin having less than 0.1% by weight of free formaldehyde, and a colorant. Some embodiments of the invention may include an ink composition that include more than one phenolic resole resin, wherein the concentration of free formaldehyde in the ink composition is less than 0.1% by weight of free formaldehyde. Embodiments of ink compositions described herein may include at least two binder resins comprising a first phenolic resole resin having less than 0.1% by weight of free formaldehyde, and a second phenolic resole resin having greater than 0.1% by weight of free formaldehyde, but preferably less than 0.6% by weight of free formaldehyde, wherein the concentration of free formaldehyde of the ink composition is less than 0.1% by weight of free formaldehyde. The compositions also optionally contain other additives such as a plasticizer, a surfactant, a conductive agent, additional solvents, an adhesion promoter, a defoamer, and/or a humectant. In preferred embodiments, the ink compositions are free of, or substantially free, of methanol, halogens, halogenated compounds and BPA.

These ink compositions perform well in terms of adhesion and drying time, and are useful for applications including single nozzle continuous inkjet printing, but also can be used in multiple nozzle continuous inkjet or binary array printing. The inventive ink compositions have superior health and safety profiles than inks that use phenolic resins that have about or greater than 0.3% by weight of free formaldehyde.

3. Embodiments of the Invention

The ink composition of the invention may have any suitable viscosity or surface tension. In embodiments of the invention, the ink compositions have a viscosity in the range of 1 cP to 10 cP, preferably in the range of 2 cP to 6 cP at 25° C. The ink compositions preferably have a viscosity of less than about 10 cP, preferably less than about 6 cPs at 25° C.

The ink compositions of the invention preferably have a surface tension from about 20 to about 30 mN/m at 25° C.

The ink compositions of the invention preferably have a resistivity at 25° C. of about 500-2000 Ohm-cm or preferably about 900-1500 Ohm-cm.

The inkjet ink compositions according to embodiments of the invention preferably are stable at least over a period of several weeks (e.g., 4-6 weeks) at temperature extremes, such as between −18° C. and 60° C.

The ink compositions according to the invention generally include one or more solvents, one or more binder resins and one or more colorants, and are sufficiently volatile to produce a fast drying time to avoid smearing, to result in a good printed product and allowing high-speed printing. Alternatively, or in addition, the ink compositions according to the invention effectively cure when subject to heat for strong substrate adhesion properties. Cure time and temperatures will vary according to various application requirements. Parameters that are considered in determining time and temperatures include the ink composition, type of substrate, and adhesion/application requirement.

The solvents and solvent mixtures used in the ink compositions according to embodiments of the invention are volatile organic solvents and may include ketones, alcohols, and acetates or any combination thereof. The amount of solvent or mixtures of solvents may vary according to the other constituents or components of the ink composition. Typically, the solvent or mixture of solvents is present in an amount of at least 60% by weight of the ink composition. Preferred embodiments contain the one or more solvents in an amount that is greater than 60% by weight of the ink composition.

Examples of suitable ketones for advantageous use in the inventive ink compositions include acetone, methyl ethyl ketone, methyl propyl ketone, methyl isopropyl ketone, diethyl ketone, cyclohexanone, diisobutyl ketone, and methyl isobutyl ketone or any combination thereof.

Examples of suitable alcohols for advantageous use in the inventive ink compositions include methanol, ethanol, isopropanol, n-propanol, butanol, iso-butanol, t-butanol, pentanol (all isomers), hexanol (all isomers), benzyl alcohol, 1-methoxy-2-propanol or any combination thereof.

Examples of suitable acetates for advantageous use in the inventive ink compositions include methyl acetate, ethyl acetate, 1-methoxy-2-propanol acetate, isopropyl acetate, n-propyl acetate, n-butyl acetate, isobutyl acetate, amyl acetate, ethylene glycol diacetate, dipropylene glycol methyl ether acetate, t-butyl acetate, methyl lactate, ethyl lactate, n-propyl lactate, isopropyl lactate, n-butyl lactate, methoxy propanol acetate or any combination thereof.

Other volatile organic solvents such as glycol ethers and carbonates that may be included as part of the one or more solvents of the inventive ink compositions include propylene glycol methyl ether, dipropylene glycol methyl ether, tripropylene glycol methyl ether, propylene glycol ethyl ether, propylene glycol n-butyl ether, propylene glycol n-propyl ether, methyl carbonate, ethyl carbonate The preferred ink composition embodiments of the invention include at least one binder resin that is a phenolic resole resin that has less than 0.1% by weight of free formaldehyde. In an embodiment, the phenolic resole resin may also contain less than 1.0% by weight of any free phenol or phenolic monomer. This binder resin may be referred to as a first binder resin or a primary binder resin. Note, more than one phenolic resole resin may be combined as the first binder resin.

Resole type phenolic resins comprise the reaction product of formaldehyde and a phenol, substituted phenols or their mixtures, reacted in the presence of a basic catalyst. These include substituted phenols having at least one attached radical selected from the group consisting of alkyl, aryl, cycloalkyl, alkenyl, cycloalkenyl, alkaryl, aralkyl, carbocyclic, halogen and mixtures thereof. Preferred embodiments of the ink compositions are halogen free. Some examples of phenolic resole resins that may be used with the inventive ink compositions disclosed herein may be, but not necessarily limited to, phenodur VPR 1785/65B or phenodur VPR 1785/70B manufactured by Allnex, HRJ-10518, SP-1045, or BRJ-473 manufactured by SI group, Bakelite PF 7835LB from Hexion, and GP® 7571 Resin from Georgia-Pacific.

Certain embodiments preferably include one or more second binder resins selected from polyacetal (e.g. polyvinyl butyral (PVB), polyvinyl formal), polyvinyl alcohol, poly (styrene-co-allyl alcohol), poly(vinyl alcohol-co-vinyl acetate), poly (vinyl alcohol-co-ethylene), melamine resin, epoxy resin, nitrocellulose resin, acrylic, vinyl resins, any other acidic resin or resins containing hydroxyl groups and any combination thereof. Because formaldehyde is present in the first or primary binder at a lower amount it may be necessary to include a secondary binder resin to further promote cross-linking reactions between the first and second binders to improve adhesion of the ink to a substrate, especially a nonporous substrate.

Examples of acrylic resins include styrene-acrylic resins which can be made by copolymerizing styrene with acrylic monomers such as acrylic acid, or methacrylic acid, and optionally with alkyl acrylate monomers such as methyl acrylate, methyl methacrylate, butyl acrylate, butyl methacrylate, hydroxyethyl acrylate, hydroxyethyl methacrylate, and the like. Styrene acrylics are commercially available under the tradename JONCRYL®. Examples of JONCRYL® resins include JONCRYL® 555, 586, 611, 678, 680, 682, 683, and 67. JONCRYL® 611, a preferred resin, has a weight average molecular weight of about 8100, an acid number of about 53, a softening temperature of about 112° C., and a glass transition temperature of about 50° C. Examples of commercially available vinyl resins are VINNOL®, available from WACKER CHEMIE® AG, and vinyl chloride resin (YMCA resin), available from Suzhou Direction Chemical Co. Ltd.

The melamine resin may be selected from but not limited to Cymel 303 or Cymel 303 LF. The nitrocellulose resin can be selected from but not limited to Scholle nitrocellulose solution or Nobel nitrocellulose resin solution. The nitrocellulose resin is preferably a 35% solution of nitrocellulose resin in 49% of MEK and 15% of isopropyl alcohol (IPA). A PVB resin is selected from but not limited to polyvinyl butyral resin named S-LEC B grade manufactured by Sekisui or Mowital manufactured by Kuraray.

The amount of the one or more first binder resins, or any combination of the first and second binder resin, in the compositions can be determined by the skilled artisan and depends on the amount of other components that are available in the ink. The first binder resin, or any combination of one or more of the first and second binder resins may be present in an amount that ranges from about 5% to about 30% by weight of the ink composition, preferably from about 15% to about 25% by weight of the ink composition and most preferably about 18% to about 22% by weight of the ink composition.

In any of the inventive embodiments, the ink composition contains at least one colorant. The colorant can be present in an amount from about 0.1% to about 12%, preferably from about 1% to about 10%, and more preferably from about 2% to about 8% by weight of the inkjet ink composition.

The colorant can be any colorant or combination of colorants suitable for the printing use. The colorant preferably is a dye. In an embodiment of the invention, one or more dyes are employed as the colorant, which dyes are selected from the group consisting of acid dyes, basic dyes, solvent dyes, disperse dyes, mordant dyes and any combination thereof. Examples of solvent dyes include naphthol dyes, azo dyes, metal complex dyes, anthraquinone dyes, quinoimine dyes, indigoid dyes, benzoquinone dyes, carbonium dyes, naphthoquinone dyes, naphthalimide dyes, phthalocyanine dyes, and perylene dyes.

For example, the ink composition according to certain embodiments of the invention can include one or more dyes selected from the group consisting of C.I. Solvent Black 3, C.I. Solvent Black 5, C.I. Solvent Black 7, C.I. Solvent Black 22, Solvent Black 26, C.I. Solvent Black 27 (such as VALIFAST BLACK® 3840L), C.I. Solvent Black 29 (such as VALIFAST BLACK® 3808, ORASOL BLACK X55™ and DL Black N36B), C.I. Solvent Black 48, any combination thereof. Preferred solvent dyes are Solvent Black 27 (VALIFAST BLACK® 3840L), Solvent Black 29 (ORASOL BLACK X55™), Solvent Black 29 (VALIFAST BLACK® 3808), Solvent Black 29 (DL Black N36B).

The ink composition of the invention may further include one or more additives such as plasticizers, surfactants, defoamers, adhesion promoters, and mixtures thereof. The additive preferably is miscible with the ink composition and does not phase separate from the composition during application of the ink to a substrate during printing.

Examples of plasticizers that are suitable for use in embodiments of the invention include Rit-Cizer #8, available from Rit-Chem Co., Inc. The plasticizer additive can be present in an amount from about 0.1% to about 5%, or preferably from about 0.3% to about 3%, by weight of the inkjet ink composition.

Examples of surfactants which can be used include fluorosurfactants, siloxanes, silicones, silanols, polyoxyalkyleneamines, propoxylated (poly(oxypropylene)) diamines, alkyl ether amines, nonyl phenol ethoxylates, ethoxylated fatty amines, quaternized copolymers of vinylpyrrolidone and dimethyl aminoethyl methacrylate, fluorinated organic acid diethanolamine salts, alkoxylated ethylenediamines, polyethylene oxides, polyoxyalkylene polyalkylene polyamines amines, polyoxyalkylene polyalkylene polyimines, alkyl phosphate ethoxylate mixtures, polyoxyalkylene derivatives of propylene glycol, and polyoxyethylated fatty alcohols, or any combination thereof. A preferred specific example of a suitable polymeric surfactant is SILWET® L-7622, available from GENERAL ELECTRIC®, which is a silicone surfactant. The surfactant additive can be present in an amount from about 0.01 to about 1.0%, or preferably from about 0.02 to about 0.5%, by weight of the inkjet ink composition.

The ink composition also can include an adhesion promoter. A suitable adhesion promoter is a silane, such as SILQUEST® WETLINK 78, which is glycidoxypropyl diethoxymethylsilane, SILQUEST® A-186 SILANE, which is beta-(3,4-epoxycyclohexyl) ethyltrimethoxy silane, and SILQUEST® A-187 SILANE, which is gamma-glycidoxypropyltrimethoxy silane, all available from GENERAL ELECTRIC®. The adhesion promoter can be present in an amount from about 0.1 to about 2%, preferably from about 0.2 to about 1.0%, and more preferably about 0.5% by weight of the ink composition.

The ink composition preferably includes little or no water. Water is preferably present in an amount less than 5%, more preferably less than 4%, even more preferably less than 3%, and most preferably less than 2% by weight of the inkjet ink composition.

The ink composition of the invention can be prepared by any suitable method. For example, the chosen ingredients may be combined and mixed with adequate stirring and the resulting fluid filtered to remove any undissolved impurities.

The present invention further provides a method for printing images on a substrate in a continuous inkjet printer comprising directing a stream of droplets of any of the embodiments of the ink composition of the invention described herein to a substrate and allowing the ink droplets to dry, thereby printing images on a substrate. Any continuous inkjet printing methods and equipment as known in the art are contemplated for use with the invention. Any suitable substrate may be printed in accordance with the invention. Examples of suitable substrates include porous substrates such as uncoated paper and cardboard and the like; semi-porous substrates such as aqueous coated paper, clay coated paper, silica coated paper, UV overcoated paper, polymer overcoated paper, and varnish overcoated paper and the like; and non-porous substrates such as plastics (e.g., high density polyethylene, low density polyethylene), polymer films, and the like, metals and alloys (e.g., steel, aluminum, brass, and the like); glass, and ceramics. Examples of suitable substrates include electric/electronic parts, automotive parts, and aerospace parts where excellent adhesion and resistance (due to chemical and mechanical forces) of the codes (while cured) are required. The paper substrates may be thin sheets of paper, rolls of paper, or cardboard. Plastics, metals, glass, and ceramic substrates may be in any suitable form such as in the form of bottles or containers, plates, rods, cylinders, etc. The paper substrates may be articles made of paper or cardboard, including thin sheets of paper, rolls of paper, or cardboard sheets. In certain embodiments, the printing operation can be performed in industries such as the dairy industry, where penetration of wet surfaces during printing may be required.

4. Example 1

Ink compositions were produced according to embodiments of the invention and tested for viscosity and resistivity. Ink compositions 1, 2, 3, 4, 5, 6, 7, 8, 9, and 10 below were produced with the indicated components. With respect to the phenolic resole resins, either Phenodur VPR 1786/65B, HRJ-10518 or BRJ-473 was used as the phenolic resole binder resin. In addition, secondary binder resins were included in some compositions.

| Component | Function | 1 | 2 | 3 | 4 | 5 |
|---|---|---|---|---|---|---|
| MEK | solvent | 61.79% | 69.50% | 69.50% | 72.8% | 74.8% |
| S-LEC B BL-10 PVB | binder resin | | 4.0% | | 4.0% | 5.0% |
| Carbset ® 527 | binder resin | | | 6.00% | | |
| Joncryl 611 | binder resin | 12.00% | | | | |
| BRJ-473 | phenolic binder resin | | | | 15.0% | |
| Phenodur ® VPR 1785/65B | phenolic binder resin | 21.00% | 18.00% | 18.00% | | 12.0% |
| TBAPF6[1] | | | 1.80% | | | |
| Silwet L-7622 | surfactant | 0.01% | 0.1% | 0.1% | 0.1% | 0.1% |
| Solvent Black 7 | colorant | 2.50% | | | | |
| BYK-065 | colorant | 0.90% | 0.9% | 0.9% | 0.9% | 0.9% |
| Valifast Black 3808 | colorant | | 7.50% | 7.20% | 7.2% | 7.2% |
| Viscosity (cps at 25 C.) | | 3.52 | 3.61 | 3.56 | 3.99 | 3.55 |
| Resistivity (Ω cm at 25 C.) | | 946 | 946 | 1283 | 1141 | 814 |

| Component | Function | 6 | 7 | 8 | 9 | 10 |
|---|---|---|---|---|---|---|
| MEK | solvent | 70.5% | 69.0% | 73.0% | 67.6% | 64.5% |
| S-LEC B BL-10 PVB | binder resin | 3.5% | 5.0% | 4.3% | 3.8% | 2.0% |
| Nitrocellulose Soluton (35% in 49% MEK/15% IPA) | | | | | | 5.0% |
| Add-Bond LTH | binder resin | 8.0% | | | | |
| Cymel 303 LF | binder resin | | 18.0% | | | |
| HRJ-10518 (Resole phenolic) | phenolic binder resin | | | 15.0% | | |
| Phenodur ® VPR 1785/65B phenolic resin | phenolic binder resin | 10.0% | | | 19.8% | 20.0% |
| Silwet L-7622 | surfactant | 0.1% | 0.1% | 0.1% | 0.1% | 0.01% |
| Solvent Black 7 | colorant | | | | | |
| BYK-065 | colorant | 0.9% | 0.9% | 0.9% | 0.9% | 0.5% |
| Valifast Black 3808 | colorant | 7.0% | 7.0% | 7.0% | | |
| DL BLACK N36B | colorant | | | | 7.80% | 8.0% |
| Viscosity (cps at 25 C.) | | 4.00 | 3.96 | 3.77 | 3.70 | 3.58 |
| Resistivity (Ω cm at 25 C.) | | 957 | 1166 | 1058 | 1337 | 1291 |

[1]TBAPF6 (tetrabutylammonium hexaflurophosphate) is a salt known to be used in ink compositions with organic solvents to increase the conductivity of ink.

5. Example 2

An ink composition was produced according to an embodiment of the invention and tested for viscosity and resistivity. Ink composition 11 below was produced with the indicated components, not including a second binder resin.

| Component | Function | 11 |
|---|---|---|
| MEK | solvent | 61% |
| Phenodur ® VPR 1785/65B | phenolic binder resin | 30% |
| Silwet L-7622 | surfactant | 0.10% |
| BYK-065 | colorant | 0.90% |
| DL Black N36B | colorant | 8% |
| Viscosity (cps at 25 C.) | | 2.08 |
| Resistivity (Ω cm at 25 C.) | | 1594 |

6. Example 3

Additional ink compositions were produced according to an embodiment of the invention and tested for viscosity and resistivity. Ink compositions 12 and 13 below were produced with the indicated components, including a second binder resin, more specifically a polyvinyl butyral resin.

| Component | Function | 12 | 13 |
|---|---|---|---|
| MEK | solvent | 53.6% | 55.7% |
| ETHANOL SDA 3C 200 PF | solvent | 12% | 55.7% |
| GP 7571 Phenolic Resin | phenolic binder resin | 13% | 13% |
| Phenodur ® VPR 1785/65B phenolic resin | phenolic binder resin | 13% | 13% |
| S-LEC B BL-10 PVB | binder resin | 2.5% | 2.9% |
| Silwet L-7622 | surfactant | 0.1% | 0.1% |
| BYK-065 | colorant | 0.9% | 0.9% |
| Rit-Cizer #8 | | 0.9% | 0.9% |
| Valifast Black 3840L | colorant | 9.4% | |
| Valifast Black 3808 | colorant | | 6.5% |
| Total | | 100% | 100% |
| sp. Gravity | | 0.89 | 0.89 |
| Viscosity (Cps at 25 C.) | | 3.85 | 3.57 |
| Resistivity (Ω cm at 25 C.) | | 1369 | 1011 |

7. Testing

Commercially available ink products were obtained for comparative testing. More specifically, VIDEOJET® ink products 16-5900, which is a continuous inkjet ink product, was used for comparative testing. The above inventive ink compositions made were tested for resistance to solvents in accordance with MIL-STD-202G Method 215K Test.

Specimen substrates with codes printed using the above inventive ink compositions and the comparative ink 16-5900 were cured at 150° C. for 30 minutes or at 110° C. for 2 hours before testing. The substrates used for testing included glass, nylon, aluminum and steel.

After being cured, the printed specimens were immersed in a solvent solution for 3 minutes. The solvent solutions included:

(1) Solvent A: a mixture of 25% Isopropyl alcohol and 75% mineral spirits (2) Solvent C: Bioact EC-7R (terpene defluxer); and, (3) Solvent D: A mixture of 95.4% water, 2.3% propylene glycol monomethyl ether and 2.3% monoethanolamine The solvent solutions A and C were maintained at a temperature of 25° C.±5° C.; and, solvent solution D was maintained at a temperature of 63° to 70° C.

After immersion in a respective solvent solution, each printed specimen was brushed with a toothbrush with typical hand pressure (2-3 ozs.).[2] The codes/substrates that passed the $1^{st}$ ten brush test then underwent a second test (solvent immersion followed by 10 brush stroke test) and then a third test (solvent immersion followed by brush stroke test). If the code was legible after the three ten (10) brush stroke tests a "PASS" was recorded as "P" otherwise a "FAILED" was recorded "F". The "P–" means the code is still legible with some acceptable levels of smearing or fading. This step was performed for each printed specimen. The tested ink compositions 2, 9 and 10 received passing grades on all substrates. Ink composition 3 received passing grades on all substrates except for the glass substrate.

TABLE I

Solvent (A) test at 25° C. +/−5° (cured at 150° C. for 30 mins)

| Ink# | 16-5900 | | | 2 | | | 3 | | |
|---|---|---|---|---|---|---|---|---|---|
| Sub/ Testing | 1st 10 Strokes | 2nd 10 Strokes | 3rd 10 Strokes | 1st 10 Strokes | 2nd 10 Strokes | 3rd 10 Strokes | 1st 10 Strokes | 2nd 10 Strokes | 3rd 10 Strokes |
| Glass Slide | P | P | P | P | P | P | F | | |
| Nylon | P | P | P | P | P | P | P | P | P |
| Aluminum | P | P | P | P | P | P | P | P | P |
| Steel | P | P | P | P | P | P | P | P | P |

TABLE II

Solvent (C) test at 25° C. +/−5° (cured at 150° C. for 30 mins)

| Ink# | 16-5900 | | | 2 | | | 3 | | |
|---|---|---|---|---|---|---|---|---|---|
| Sub/ Testing | 1st 10 Strokes | 2nd 10 Strokes | 3rd 10 Strokes | 1st 10 Strokes | 2nd 10 Strokes | 3rd 10 Strokes | 1st 10 Strokes | 2nd 10 Strokes | 3rd 10 Strokes |
| Glass Slide | P | P | P | P | P | P | P | P | F |
| Nylon | P | P | P | P | P | P | P | P | P |
| Aluminum | P | P | P | P | P | P | P | P | P |
| Steel | P | P | P | P | P | P | P | P | P |

TABLE III

| Solvent (D) test at 63-70° C. (cured at 150° C. for 30 mins) | | | | | | | | | |
|---|---|---|---|---|---|---|---|---|---|
| Ink# | 16-5900 | | | 2 | | | 3 | | |
| Sub/ Testing | 1st 10 Strokes | 2nd 10 Strokes | 3rd 10 Strokes | 1st 10 Strokes | 2nd 10 Strokes | 3rd 10 Strokes | 1st 10 Strokes | 2nd 10 Strokes | 3rd 10 Strokes |
| Glass Slide | P | F | | P | P | P | F | | |
| Nylon | P | P | P | P | P | P | P | P | P |
| Aluminum | P | P | P | P | P | P | P | P | P |
| Steel | P | P | P | P | P | P | P | P | P |

TABLE IV

| Solvent (A test at 25° C. +/−5° (cured at 110° C. for 2 hours) | | | | | | | | | |
|---|---|---|---|---|---|---|---|---|---|
| Ink# | 9 | | | 10 | | | 16-5900 | | |
| Sub/ Testing | 1st 10 Strokes | 2nd 10 Strokes | 3rd 10 Strokes | 1st 10 Strokes | 2nd 10 Strokes | 3rd 10 Strokes | 1st 10 Strokes | 2nd 10 Strokes | 3rd 10 Strokes |
| Glass Slide | P | P | P | P | P | P | P | P | P |
| Nylon | P | P | P | P | P | P | P | P | P |
| Aluminum | P | P | P | P | P | P | P | P | P |
| Steel | P | P | P | P | P | P | P | P | P |

TABLE V

| Solvent (C) test at 25° C. +/−5° (cured at 110° C. for 2 hours) | | | | | | | | | |
|---|---|---|---|---|---|---|---|---|---|
| Ink# | 9 | | | 10 | | | 16-5900 | | |
| Sub/ Testing | 1st 10 Strokes | 2nd 10 Strokes | 3rd 10 Strokes | 1st 10 Strokes | 2nd 10 Strokes | 3rd 10 Strokes | 1st 10 Strokes | 2nd 10 Strokes | 3rd 10 Strokes |
| Glass Slide | P | P | P | P | P | P | P | P | P |
| Nylon | P | P | P | P | P | P | P | P | P |
| Aluminum | P | P | P | P | P | P | P | P | P |
| Steel | P | P | P | P | P | P | P | P | P |

TABLE VI

| Solvent (D) test at 63-70° C. (cured at 110° C. for 2 hours) | | | | | | | | | |
|---|---|---|---|---|---|---|---|---|---|
| Ink# | 9 | | | 10 | | | 16-5900 | | |
| Sub/ Testing | 1st 10 Strokes | 2nd 10 Strokes | 3rd 10 Strokes | 1st 10 Strokes | 2nd 10 Strokes | 3rd 10 Strokes | 1st 10 Strokes | 2nd 10 Strokes | 3rd 10 Strokes |
| Glass Slide | P | F | F | F | F | F | F | F | F |
| Nylon | P | P | P | P | P | P | P | P | P |
| Aluminum | NA | NA | NA | NA | NA | NA | NA | NA | NA |
| Steel | P | P | P | P | P | P | P | P | P |

Ink composition 11 was also tested for resistance to solvents in accordance with MIL-STD-202G Method 215K Test as described above. The test results are shown below in Table VII. As shown below, the ink composition 11 received a passing grade for all substrates with the exception of the glass substrate. The grade "P−" means that the printed code or ink passed with some acceptable level of smearing or fading.

[2] A toothbrush with a handle made of a non-reactive material was used. The brush had three or four long rows of bristles, and each row was, 1 and 1/8±1/8 inch in length, of hard bristles. Each row contained eight to twelve tufts, the free ends of which shall lie substantially in the same plane. Each brush was used with a single solvent and were discarded when there is any evidence of softening, bending, wear, or loss of bristles.

TABLE VII

| | 11 (cured at 150° C. for 30 minutes) | | | | | | | | |
|---|---|---|---|---|---|---|---|---|---|
| Solvent | Solvent A | | | Solvent C | | | Solvent D | | |
| Sub/Testing | 1st 10 Strokes | 2nd 10 Strokes | 3rd 10 Strokes | 1st 10 Strokes | 2nd 10 Strokes | 3rd 10 Strokes | 1st 10 Strokes | 2nd 10 Strokes | 3rd 10 Strokes |
| Glass Slide | P | P- | F | P | P | P | P | F | F |
| Nylon | P | P | P | P | P | P | P | P | P |
| Aluminum | P | P | P | P | P | P | P | P | P |
| Steel | P | P | P | P | P | P | P | P | P |

Ink compositions 12 and 13 were also tested for resistance to solvents in accordance with MIL-STD-202G Method 215K Test as described above. The test results are shown below in Tables VIII through XI. As shown below, the ink compositions 12 and 13 received a passing grade for all substrates except for the glass substrate. The grade "P–" means that the printed code or ink passed with some acceptable level of smearing or fading.

TABLE VIII

| | 12 (cured at 150° C. for 30 minutes) | | | | | | | | |
|---|---|---|---|---|---|---|---|---|---|
| Solvent | Solvent A | | | Solvent C | | | Solvent D | | |
| Sub/Testing | 1st 10 Strokes | 2nd 10 Strokes | 3rd 10 Strokes | 1st 10 Strokes | 2nd 10 Strokes | 3rd 10 Strokes | 1st 10 Strokes | 2nd 10 Strokes | 3rd 10 Strokes |
| Glass Slide | P | P | P | P | P | P | P- | F | F |
| Nylon | P | P | P | P | P | P | P | P | P |
| Aluminum | P | P | P | P | P | P | P | P | P |
| Steel | P | P | P | P | P | P | P | P | P |

TABLE IX

| | 13 (cured at 150 C. for 30 minutes) | | | | | | | | |
|---|---|---|---|---|---|---|---|---|---|
| Solvent | Solvent A | | | Solvent C | | | Solvent D | | |
| Sub/Testing | 1st 10 Strokes | 2nd 10 Strokes | 3rd 10 Strokes | 1st 10 Strokes | 2nd 10 Strokes | 3rd 10 Strokes | 1st 10 Strokes | 2nd 10 Strokes | 3rd 10 Strokes |
| Glass Slide | P | P | P | P | P | P | F | F | F |
| Nylon | P | P | P | P | P | P | P | P | P |
| Aluminum | P | P | P | P | P | P | P | P | P |
| Steel | P | P | P | P | P | P | P | P | P |

TABLE X

| | 12 (cured at 110 C. for 2 hours) | | | | | | | | |
|---|---|---|---|---|---|---|---|---|---|
| Solvent | Solvent A | | | Solvent C | | | Solvent D | | |
| Sub/Testing | 1st 10 Strokes | 2nd 10 Strokes | 3rd 10 Strokes | 1st 10 Strokes | 2nd 10 Strokes | 3rd 10 Strokes | 1st 10 Strokes | 2nd 10 Strokes | 3rd 10 Strokes |
| Glass Slide | P | P | P | P | P | P | F | F | F |
| Nylon | P | P | P | P | P | P | P | P | P |
| Aluminum | P | P | P | P | P | P | P | P | P |
| Steel | P | P | P | P | P | P | P | P | P |

TABLE XI

| | 13 (cured at 110 C. for 2 hours) | | | | | | | | |
|---|---|---|---|---|---|---|---|---|---|
| Solvent | Solvent A | | | Solvent C | | | Solvent D | | |
| Sub/Testing | 1st 10 Strokes | 2nd 10 Strokes | 3rd 10 Strokes | 1st 10 Strokes | 2nd 10 Strokes | 3rd 10 Strokes | 1st 10 Strokes | 2nd 10 Strokes | 3rd 10 Strokes |
| Glass Slide | P | P | P | P | P | P | P- | F | F |
| Nylon | P | P | P | P | P | P | P | P | P |
| Aluminum | P | P | P | P | P | P | P | P | P |
| Steel | P | P | P | P | P | P | P | P | P |

The invention claimed is:

1. A continuous inkjet ink composition, comprising:
   one or more volatile organic solvents;
   one or more binder resins including a phenolic resole resin; and
   one or more colorants;
   wherein the ink composition is free of or substantially free of, halogens, halogenated compounds and bisphenol-A and free of methanol, and
   wherein the ink composition is heat curable after printing.

2. The ink composition of claim 1, wherein less than 0.1% by weight of the ink composition is free formaldehyde.

3. The ink composition of claim 2, wherein the one or more binder resins includes a first phenolic resole resin that contains less than 0.1% by weight of free formaldehyde and a second phenolic resole resin that contains more than 0.1% by weight of free formaldehyde.

4. The ink composition of claim 3, wherein the second phenolic resole resin has between 0.1% and 0.6% by weight of free formaldehyde.

5. The ink composition of claim 1, wherein a phenolic resole resin is one of the one or more binder resin and the phenolic resole resin contains less than 0.1% by weight of free formaldehyde.

6. The ink composition of claim 1, wherein the phenolic resole resin is a first binder resin and the ink composition comprises one or more second binder resins selected from the group consisting of acrylic, polyacetal, polyvinyl alcohol, poly(styrene-co-allyl alcohol), poly(vinyl alcohol-co-vinyl acetate), poly (vinyl alcohol-co-ethylene), melamine resin, epoxy resin, cellulose esters, cellulose ethers, nitrocellulose resin, styrene-acrylic copolymers, and any other hydroxyl or acidic resin and any combinations thereof.

7. The ink composition of claim 6, wherein the polyacetal can be polyvinyl butyral, or polyvinyl formal.

8. The ink composition of claim 1, wherein the solvent is present in an amount of about 60% or greater by weight of the ink composition.

9. The ink composition of claim 1, wherein the solvent is present in an amount of about 70% or greater by weight of the ink composition.

10. The ink composition of claim 1, wherein phenolic resole resin is present in amount of about 15% to about 22% by weight of the ink composition.

11. The ink composition of claim 1, wherein the phenolic resole resin is a first binder resin and the ink composition further comprises a second binder resin and a combination of the first binder resin and the second binder resin is present in amount of about 5% to about 30% by weight of the ink composition.

12. The ink composition of claim 11, wherein a combination of the one or more first binder resin and one or more second binder resin is present in amount of about 5% to about 30% by weight of the ink composition.

13. The ink composition of claim 11, wherein a combination of the one or more first binder resin and one or more second binder resin is present in an amount of about 15% to about 22% by weight of the ink composition.

14. A method of continuous inkjet printing on a substrate, comprising: directing a stream of droplets of an ink composition of claim 1 onto a substrate, and then heating the printed ink on the substrate to a predetermined temperature to heat cure the ink on the substrate.

15. The method of claim 14, wherein the substrate is nonporous.

16. The method of claim 14, wherein the substrate is selected from the group consisting of glass, ceramic, polymer films, metals and alloys.

17. The method of claim 14, wherein the printed ink is heat cured at 150° C. for 30 minutes or at 110° C. for 2 hours after printing.

18. The continuous inkjet ink composition of claim 1, wherein the colorant is a dye.

19. The continuous inkjet ink composition of claim 1, wherein the ink composition is heat cured at 150° C. for 30 minutes or at 110° C. for 2 hours after printing.

20. A continuous inkjet ink composition, comprising:
   one or more volatile organic solvents;
   one or more first binder resins including a phenolic resole resin;
   one or more second binder resins, wherein the combination of the one or more first binder resins and one or more second binder resins is present in an amount from about 5% to about 30% by weight of the ink composition; and
   one or more colorants;
   wherein the ink composition is free of methanol, halogens, halogenated compounds and bisphenol-A, and
   wherein the ink composition is heat curable.

21. The ink composition of claim 20, wherein the phenolic resole resin has less than 0.1% by weight of free formaldehyde, and the concentration of free formaldehyde in the ink composition is less than 0.1%.

22. The ink composition of claim 21, wherein the one or more second binder resins include a phenolic resole resin that has more than 0.1% by weight of free formaldehyde.

23. The ink composition of claim 20, wherein the one or more second binder resins selected from the group consisting of acrylic, polyacetal, polyvinyl alcohol, poly(vinyl alcohol-co-vinyl acetate), poly (vinyl alcohol-co-ethylene), melamine resin, epoxy resin, cellulose esters, cellulose ethers, nitrocellulose resin, styrene-acrylic copolymers, and any other hydroxyl or acidic resin and any combination thereof.

24. The ink composition of claim 20, wherein the solvent is present in an amount of 60% or greater by weight of the ink composition.

25. The ink composition of claim 20, wherein the solvent is present in an amount of 70% or greater by weight of the ink composition.

26. The ink composition of claim 20, wherein the combination of the one or more first resin and one or more second binder resin is present in amount of about 15% to about 22% by weight of the ink composition.

27. The continuous inkjet ink composition of claim 20, wherein the colorant is a dye.

28. The continuous inkjet ink composition of claim 20, wherein the ink composition is heat cured at 150° C. for 30 minutes or at 110° C. for 2 hours after printing.

* * * * *